March 31, 1953 D. O. NELSON 2,633,405

STYLUS STRUCTURE FOR ELECTRICAL RECORDERS

Filed Dec. 28, 1950

INVENTOR

D. O. Nelson

BY [signature]

ATTORNEY

Patented Mar. 31, 1953 2,633,405

UNITED STATES PATENT OFFICE 2,633,405

STYLUS STRUCTURE FOR ELECTRICAL RECORDERS

Donald O. Nelson, Los Angeles, Calif., assignor to Bendix Aviation Corporation, South Bend, Ind., a corporation of Delaware Application December 28, 1950, Serial No. 203,056

5 Claims. (Cl. 346—139)

This invention relates to electric recorders of the type in which a stylus is swept across a record blank, and has to do with the stylus structure of such a recorder.

An object of the invention is to provide a simple, light, inexpensive and efficient stylus structure.

Another object is to provide a stylus structure in which the stylus can be easily and quickly replaced.

Another object is to provide a stylus structure in which the stylus has an exceptional resilience in proportion to its free length.

Other more specific objects and features of the invention will appear from the description to follow.

Briefly, the stylus structure of the present invention consists of a base member attached to a scanning carriage, and a preformed spring stylus wire detachably supported on the base member by spring engagement with lugs on the base. The lugs are constituted by extensions of a sheet metal piece embedded in the base member, which may be of rubber or the like. The stylus wire, when in engagement with the lugs, has a lateral section extending from the base member at right angles to the path of the scanning carriage and parallel to the record blank, and a stylus section extending from the lateral section at right angles thereto into contact with the record blank. The end of the stylus section is yieldably lightly urged against the record blank primarily by the spring reaction of the lateral section in torsion.

A full understanding of the invention may be had from the following detailed description with reference to the drawing, in which.

Figures 1, 2, 3, 4:
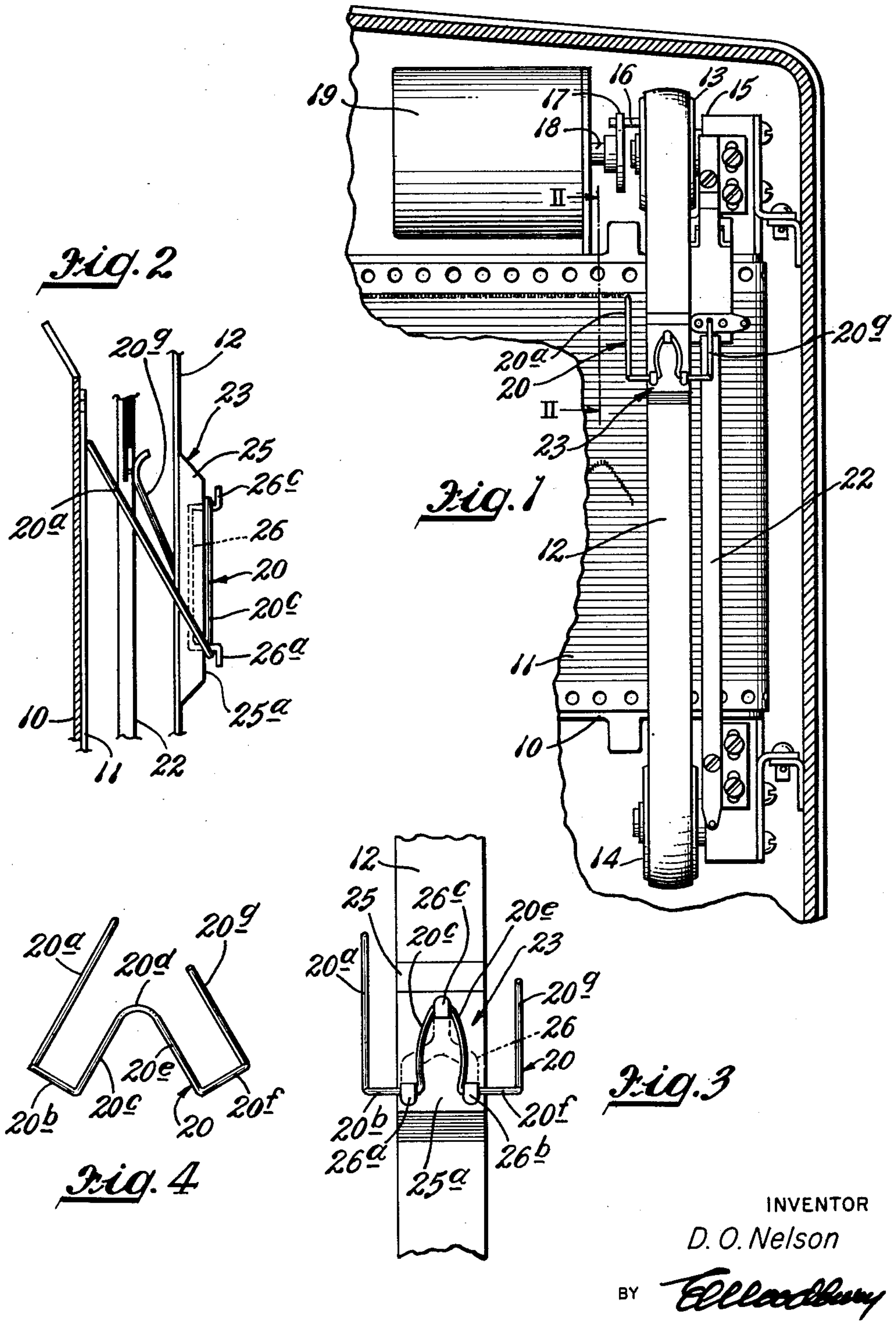
Fig. 1 is a front elevational view of a portion of an electrical depth recorder incorporating a stylus in accordance with the present invention.
Fig. 2 is a cross section taken in the plane II—II of Fig. 1, and showing the stylus structure in side elevation.
Fig. 3 is an enlarged front elevational view of the stylus structure of the invention.
Fig. 4 is a view of the spring wire stylus element in the shape it assumes when it is detached from the rest of the stylus structure.

Referring to Fig. 1, the recorder therein depicted comprises a backing plate 10 over which a record strip or blank 11, usually of paper, is fed slowly from right to left by any suitable paper moving mechanism. A depth recorder of this type is fully disclosed in H. A. Stamper, D. O. Nelson and J. A. Wippert application, Serial No. 29,146, filed May 25, 1948, now Patent No. 2,597,199, dated May 20, 1952, and reference is made to that patent if further information is desired on the details of operation of such a recorder. Since the present invention relates only to the stylus structure, it is not necessary to fully describe the recorder.

The portion of the recorder illustrated in Fig. 1 comprises, in addition to the record strip or blank 11 and the backing plate 10 therefor, a belt 12 which is stretched between upper and lower pulleys 13 and 14 respectively. The pulley 13 is supported on a suitable bearing from a bracket 15 and is coupled by a pin 16 projecting from its left side, and a slotted disc 17, to the shaft 18 of a driving motor 19 for driving the belt 12 at a constant speed. The lower pulley 14 is an idler pulley to maintain the belt in taut condition. A stylus structure 23 is mounted on the belt 12 for movement therewith. This stylus structure includes a stylus 20*a* and a brush 20*g*, and the movement of the belt periodically drags the stylus 20*a* across the record blank 11, and drags the brush 20*g* across suitable cooperating electrical elements for actuating a transmitting circuit associated with the recorder, and for completing electrical connection to the stylus 20. Thus during traverse of the blank 11 by the stylus 20*a*, the brush 20*g* rides along a conductive track 22 which is electrically connected to a circuit for supplying a potential to the stylus 20 to produce a mark on the record blank 11. The location of such mark is determined by the position of the stylus on the record blank at the time the potential is applied.

The present invention relates entirely to the scanning structure 23 which may be mounted on any form of scanning carriage, the scanning carriage in this instance consisting of the belt 12.

Referring to Figs. 2, 3 and 4, the stylus structure 23 comprises a relatively flat base member 25 of rubber or the like which is secured in this instance to the belt 12 by a suitable adhesive. The other face 25*a* of the base 25 has projecting therefrom three lugs 26*a*, 26*b* and 26*c* respectively which constitute the upturned edges of a sheet metal piece 26 that is embedded in the base 25.

The lugs 26*a*, 26*b* and 26*c* detachably secure to the outer face 25*a* of the block 25 a spring wire stylus element 20, the outer end sections 20*a* and 20*g* respectively of which constitute the stylus and brush previously referred to.

It will be noted from Fig. 4 that the stylus element 20 consists of a central U-shaped portion consisting of straight sections 20*c* and 20*e* constituting the legs of the U, and a curved section 20*d* constituting the bight of the U. The outer ends of the straight sections 20*c* and 20*e*, constituting the legs of the U, merge into straight sections 20*b* and 20*f* respectively which, as shown in Fig. 3, extend in opposite directions substantially at right angles to the direction of movement of the belt. The free ends 20*a* and 20*g* constitute the stylus and brush ends of the structure, and extend substantially at right angles from the outer ends of the lateral sections 20*b* and 20f respectively, and at such an angle to the plane of the path of movement of the belt 12 that the end section 20a scans the record blank 11, and the brush section 20g contacts its associated electrical elements during each cyclical movement of the belt.

The stylus element 20 is preformed to the shape shown in Fig. 4, and it is mounted on the base 25 by engaging the bight 20d of the U under the lug 26c and then distorting the element sufficiently to engage the lateral sections 20b and 20f under the lugs 26a and 26b respectively, as shown in Fig. 3. The natural resilience of the stylus element holds it securely in engagement with the lugs 26a, 26b and 26d during operation of the recorder, but it can readily be removed by distorting it, when it is desired to change the stylus element.

The end of the stylus section 20a and the end of the brush section 20g should bear lightly against the record blank, and the electrical element, respectively, during their traverse, and to this end it is desirable that the ends 20a and 20g be able to deflect through a substantial arc without meeting materially increased resistance. In structures previously known to me, difficulty has been encountered in obtaining sufficient freedom of movement of the stylus and brush without objectionably increasing the spring resistance to such movement. However, the present structure is unusually effective in this respect, because of the lateral sections 20e and 20f of the stylus element that are interposed between the anchored portion of the element and the end sections 20a and 20g respectively. These sections 20b and 20f bend or twist in torsion in response to deflection of the ends 20a and 20g produced by contact with their cooperating elements. This resistance to torsion is relatively slight but is relatively constant over quite an arc of movement of the ends 20a and 20g.

The invention is not limited in its usefulness to a structure requiring both a stylus and a brush. If the invention is to be used in a recorder that does not require a brush, the end portion 20g and a portion of the lateral section 20f can be eliminated.

The deflection of either the end 20a or the end 20g has substantially no effect on the other end, since there is no torque transmitted from one of the lateral sections 20b past the bight 20d of the element to the other lateral section.

The stylus structure as described is highly desirable because it provides a light but uniform pressure of the stylus tip against the record blank, permits rapid and easy replacement of the stylus element when it becomes worn, and is inexpensive to manufacture.

When the invention is used with a belt as the scanning carriage, as shown, it is desirable that the base member 25 be made of relatively soft material such as sponge rubber, so that it can yield as necessary to permit the bending of the belt as the latter flows around the drive pulleys. If the base member 25 is made of sufficiently soft rubberlike material it can bend as the belt flows around the pulley without producing any appreciable bending of the embedded plate 26.

Although for the purpose of explaining the invention, a particular embodiment thereof has been shown and described, obvious modifications will occur to a person skilled in the art, and I do not desire to be limited to the exact details shown and described.

I claim:

1. A stylus structure for an electrical recorder having a scanning carriage movable past a record blank for scanning the blank, said stylus structure comprising: a flat base member adapted to be attached to the scanning carriage for movement therewith past the record blank in parallel relation thereto, said base member having a plurality of lugs extending therefrom on the side remote from said record blank, and a spring wire stylus element engageable with said lugs by distortion of said element from its normal shape, the resilience of said element yieldably retaining it in engagement with said lugs, and said element when so retained by said lugs having a free end extending past the edge of said base member into contact with the record blank, said lugs being three in number, triangularly disposed on said base, and said stylus element having a U-shaped section, the bight of which is engaged by one of said lugs, and having lateral sections extending outwardly in opposite directions from the ends of said U section, said respective lateral sections being each engaged by one of the other two lugs, said free end of said stylus element extending from the outer end of one of said lateral sections.

2. A stylus structure according to claim 1 in which said stylus element has a second free end extending from the outer end of the other of said lateral sections.

3. A stylus structure for an electrical recorder having a scanning carriage movable past a record blank for scanning the blank, said stylus structure comprising: a base member adapted to be attached to the scanning carriage; a spring wire stylus element; means securing a portion of said stylus element to said base member, said element including a lateral section extending outwardly from said secured portion approximately at right angles to the direction of movement of said carriage and parallel to said record blank; and a free end section extending from the outer end of said lateral section approximately at right angles thereto into contact with said record blank as the carriage moves therepast.

4. A stylus structure according to claim 3 including a second lateral section extending outwardly from the other side of said secured portion and in direction substantially opposite to said mentioned lateral section, and a second free end section extending from the outer end of said second lateral section approximately at right angles thereto and substantially parallel to said first mentioned free end section.

5. A stylus structure according to claim 1 in which said base member comprises a body member of rubberlike material adapted to have one face thereof secured to said scanning carriage, and a sheet metal element embedded in said body member and having edge portions constituting said lugs projecting from the other face of said body member.

DONALD O. NELSON.

REFERENCES CITED

The following references are of record in the file of this patent:

UNITED STATES PATENTS

| Number | Name | Date |
|---|---|---|
| 2,530,739 | Stamper | Nov. 21, 1950 |
| 2,557,196 | Nelson | June 19, 1951 |